US012732320B2

(12) United States Patent
Liu et al.

(10) Patent No.: US 12,732,320 B2
(45) Date of Patent: Sep. 8, 2026

(54) SOUNDING SCHEMES USING DISTRIBUTED TONES IN WIRELESS COMMUNICATIONS

(71) Applicant: MediaTek Singapore Pte. Ltd., Singapore (SG)

(72) Inventors: Jianhan Liu, San Jose, CA (US); Shengquan Hu, San Jose, CA (US); Yongho Seok, San Jose, CA (US); Kai Ying Lu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 19/094,903

(22) Filed: Mar. 29, 2025

(65) Prior Publication Data

US 2025/0226947 A1 Jul. 10, 2025

Related U.S. Application Data

(63) Continuation of application No. 17/396,738, filed on Aug. 8, 2021, now abandoned.

(60) Provisional application No. 63/064,437, filed on Aug. 12, 2020.

(51) Int. Cl.

| | |
|---|---|
| ***H04L 5/00*** | (2006.01) |
| ***H04L 69/22*** | (2022.01) |
| ***H04W 72/0453*** | (2023.01) |

(52) U.S. Cl.
CPC ............ *H04L 5/0048* (2013.01); *H04L 69/22* (2013.01); *H04W 72/0453* (2013.01)

(58) Field of Classification Search
CPC ... H04L 5/0048; H04L 5/0053; H04L 5/0091; H04L 5/0007; H04L 5/0023; H04L 5/0057; H04L 69/22; H04L 69/04; H04L 69/323; H04L 43/02; H04L 49/9042; H04W 28/06; H04W 72/0453
See application file for complete search history.

(56) References Cited

U.S. PATENT DOCUMENTS

| | | | | |
|---|---|---|---|---|
| 2019/0349067 | A1* | 11/2019 | Huang | H04B 7/0697 |
| 2021/0367886 | A1* | 11/2021 | Chen | H04L 27/2603 |
| 2021/0399838 | A1 | 12/2021 | Lou et al. | |
| 2022/0030604 | A1 | 1/2022 | Noh et al. | |
| 2022/0294558 | A1* | 9/2022 | Park | H04L 5/0007 |

* cited by examiner

*Primary Examiner* — Brian T Le
(74) *Attorney, Agent, or Firm* — Andy M. Han; Han IP PLLC

(57) ABSTRACT

Various examples pertaining to sounding schemes using distributed tones in wireless communications are described. A stations (STA) receives a sounding signal with an extremely-high-throughput (EHT) null data packet (NDP). The STA then transmits a feedback regarding the sounding signal on a distributed-tone resource unit (DT-RU).

20 Claims, 7 Drawing Sheets

Figure 2:
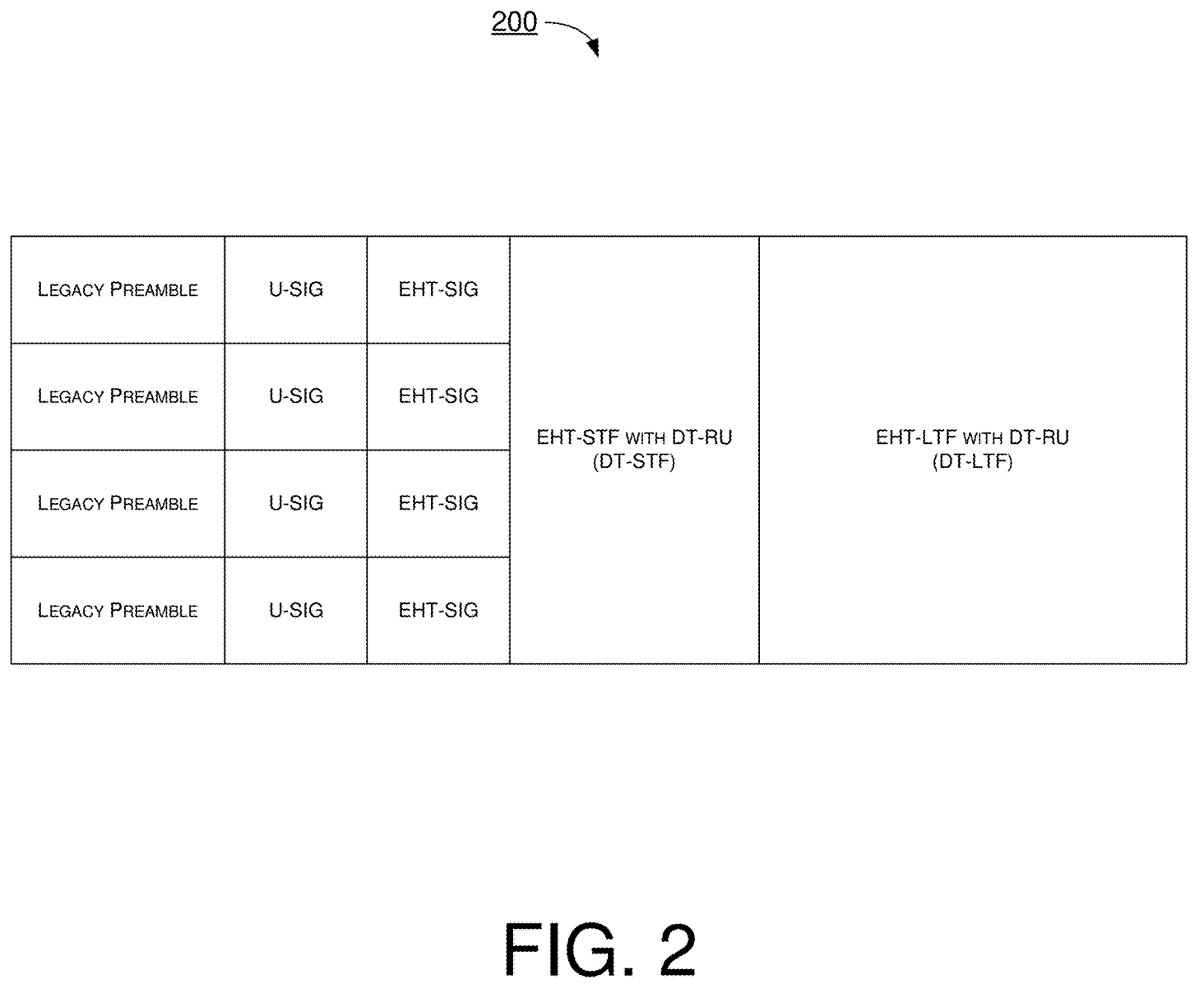

200

| Legacy Preamble | U-SIG | EHT-SIG | EHT-STF with DT-RU (DT-STF) | EHT-LTF with DT-RU (DT-LTF) |
|---|---|---|---|---|
| Legacy Preamble | U-SIG | EHT-SIG | | |
| Legacy Preamble | U-SIG | EHT-SIG | | |
| Legacy Preamble | U-SIG | EHT-SIG | | |

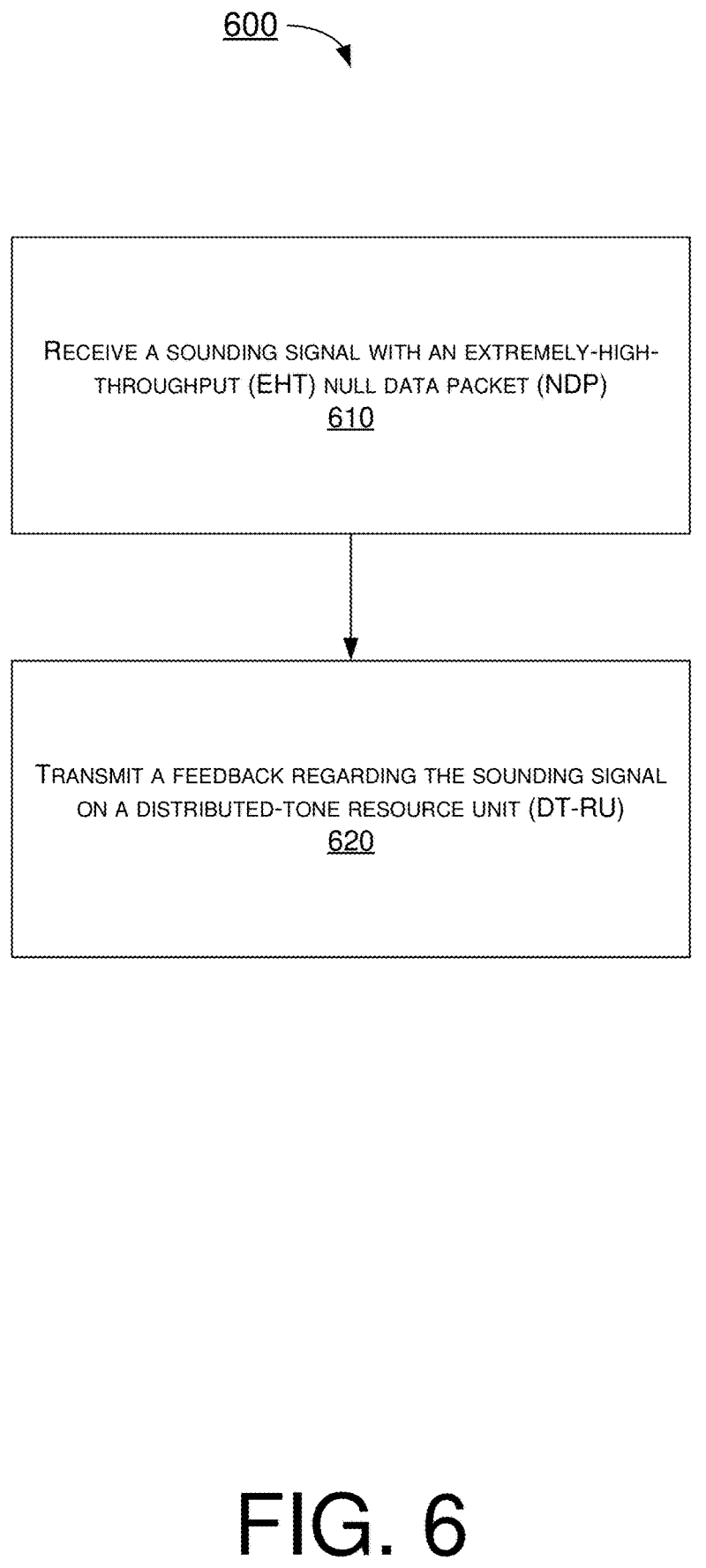

RECEIVE A SOUNDING SIGNAL WITH AN EXTREMELY-HIGH-THROUGHPUT (EHT) NULL DATA PACKET (NDP)
610

TRANSMIT A FEEDBACK REGARDING THE SOUNDING SIGNAL ON A DISTRIBUTED-TONE RESOURCE UNIT (DT-RU)
620

FIG. 6

TRANSMIT A SOUNDING SIGNAL WITH AN EXTREMELY-HIGH-THROUGHPUT (EHT) NULL DATA PACKET (NDP)
710

RECEIVE A FEEDBACK REGARDING THE SOUNDING SIGNAL ON A DISTRIBUTED-TONE RESOURCE UNIT (DT-RU)
720

SOUNDING SCHEMES USING DISTRIBUTED TONES IN WIRELESS COMMUNICATIONS

CROSS REFERENCE TO RELATED PATENT APPLICATION

The present disclosure is a Continuation of U.S. patent application Ser. No. 17/396,738, filed 8 Aug. 2021 and claiming the priority benefit of U.S. Provisional Patent Application No. 63/064,437, filed 12 Aug. 2020. Contents of aforementioned applications are herein incorporated by reference in their entirety.

TECHNICAL FIELD

The present disclosure is generally related to wireless communications and, more particularly, to sounding schemes using distributed tones in wireless communications.

BACKGROUND

Unless otherwise indicated herein, approaches described in this section are not prior art to the claims listed below and are not admitted as prior art by inclusion in this section.

In next-generation wireless communications such as those implemented in wireless local area networks (WLANs) based on the Institute of Electrical and Electronics Engineers (IEEE) 802.11be standards, there are certain Federal Communications Commission (FCC) rules on the 2.4 GHz, 5 GHZ and 6 GHz bands. For the 2.4 GHz and 5 GHZ bands, the equivalent isotropically radiated power (EIRP) of a power spectral density (PSD) limit is capped at 20 dBm for a 20 MHz transmission, and the transmit (Tx) power limit is capped at 30 dBm. With a reasonable Tx power assumption, the FCC requirement does not limit Tx power for narrow-bandwidth transmissions. For 6 GHz low-power indoor (LPI) applications, however, the FCC requirement on PSD limit is far more stringent than that for the 2.4 GHz and 5 GHz bands. Specifically, EIRP is limited to 5 dBm/MHz for an access point (AP in 6 GHZ LPI as opposed to an EIRP limit at 17 dBm/MHz for an AP in 5 GHz. Similarly, EIRP is limited to −1 dBm/MHz for an AP in 6 GHZ LPI as opposed to an EIRP limit at 11 dBm/MHz for an AP in 5 GHz. Moreover, for a beacon transmitted in 6 GHz using a 20 MHz physical-layer protocol data unit (PPDU), the range is half of that of a 5 GHz beacon. If a downlink (DL) trigger frame uses 20 MHz bandwidth and a station (STA) intends to utilize a similar range by using a small-size resource unit (RU), then there would be an issue given the limit on PSD. Therefore, there is a need for a solution to avoid the PSD limit.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to sounding schemes using distributed tones in wireless communications. Under various proposed schemes in accordance with the present disclosure, it is believed that issue(s) described herein may be addressed.

In one aspect, a method may involve receiving a sounding signal with an EHT null data packet (NDP). The method may also involve transmitting a feedback regarding the sounding signal on a distributed-tone resource unit (DT-RU).

In one aspect, a method may involve transmitting a sounding signal with an EHT NDP. The method may also involve receiving a feedback regarding the sounding signal on a DT-RU.

In yet another aspect, an apparatus may include a transceiver and a processor coupled to the transceiver. The transceiver may be configured to communicate wirelessly. The processor may receive, via the transceiver, a sounding signal with an EHT NDP. The processor may transmit, via the transceiver, a feedback regarding the sounding signal on a DT-RU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design in accordance with an implementation of the present disclosure.

FIG. 6 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to sounding schemes using distributed tones in wireless communications. According to the present disclosure, a number of possible solutions may be implemented separately or jointly. That is, although these possible solutions may be described below separately, two or more of these possible solutions may be implemented in one combination or another.

It is noteworthy that, although examples described herein and illustrated in the figures may show a first RU of size A and a second RU of size B, as in RU A+RU B, various proposed schemes in accordance with the present disclosure may be implemented with RU A+RU B, or vice versa (e.g., RU B+RU A). In other words, the scope of the present disclosure is not limited to the examples presented herein and, rather, also covers variations thereof. For instance, for a multi-RU group (996+484), the order of RUs may be exchanged in different implementations such as, for example, a first RU of size 484 plus a second RU of size 996 in one implementation or, alternatively, a firs RU of size 996 plus a second RU of size 484 in another implementation. Moreover, in the present disclosure, aggregated multiple RUs may be interchangeably referred to as “multi-RU” and “MRU”. Thus, in the aforementioned example, the multi-RU group (996+484), which is an aggregation of two RUs (namely a 996-tone RU and a 484-tone RU), may be referred to as a multi-RU (996+484) or an MRU (996+484).

Figure 1:
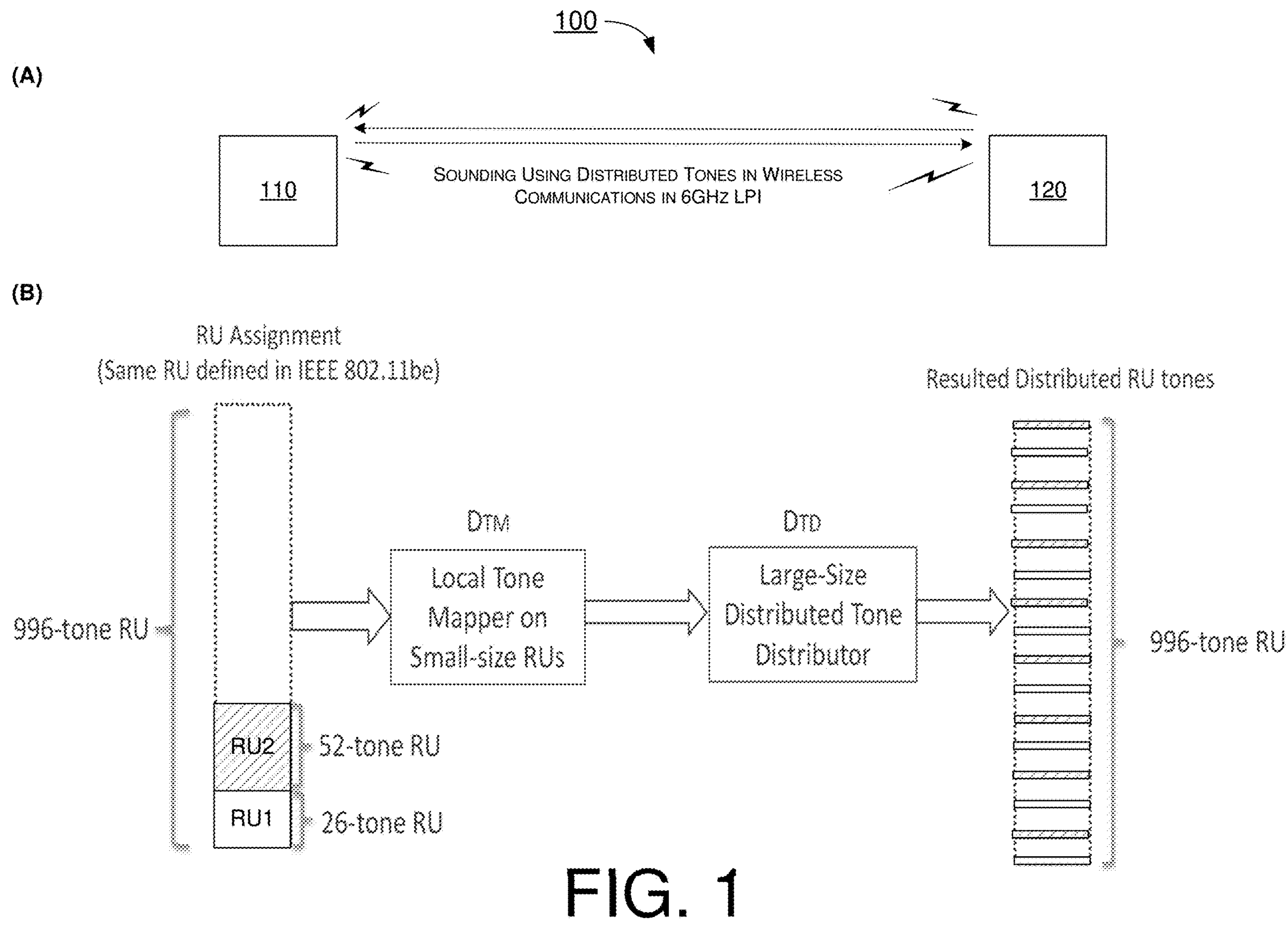
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7.

Referring to part (A) of FIG. 1, network environment 100 may involve a communication entity 110 and a communication entity 120 communicating wirelessly (e.g., in a WLAN in accordance with one or more IEEE 802.11 standards). For instance, communication entity 110 may be a first STA and communication entity 120 may be a second STA, with each of the first STA and second STA being an access point (AP) or a non-AP STA. Under various proposed schemes in accordance with the present disclosure, communication entity 110 and communication entity 120 may be configured to perform sounding using distributed tones in wireless communications, as described herein.

It is noteworthy that, in a long range (LR) PPDU, the extremely-high-throughput (EHT) short training field (EHT-STF) and the EHT long training field (EHT-LTF) can use DT-RUs. The DT-RUs may be generated by applying a large-size tone distributor (DTD) on an assigned logical RU, and a local tone mapper may be bypassed in the process. For instance, a 26-tone RU and a 52-tone RU may be distributed on a 996-tone RU. Thus, under the proposed schemes, an EHT NDP may include at least one larger DT-RU (e.g., 996-tone DT-RU) having a plurality of blank tones as well as tones of first and second RUs smaller than 996 tones (e.g., 26-tone RU and 52-tone RU) that are distributed in a non-contiguous fashion on a plurality of non-continuous tones of the larger DT-RU without filling up an entire bandwidth of the larger DT-RU such that each distributed tone of the first RU and each distributed tone of the second RU is between respective two blank tones of the plurality of blank tones the larger DT-RU.

Referring to part (B) of FIG. 1, under the proposed schemes in accordance with the present disclosure, tones of a 26-tone RU (denoted as “RU1” in FIG. 1) and tones of the 52-tone RU (denoted as “RU2” in FIG. 1) are distributed, in a non-contiguous fashion, onto non-contiguous tones of a 996-tone DT-RU to result in a distribution in a sandwiched fashion in which each distributed tone of the 26-tone RU and each distributed tone of the 52-tone RU is between respective two blank tones of the 996-tone DT-RU (e.g., as shown on the righthand side of part (B) of FIG. 1, each of the distributed tone from the 26-tone RU and each of the distributed tone from the 52-tone RU is sandwiched between respective two blank tones of the 996-tone DT-RU).

Under a proposed scheme in accordance with the present disclosure, a long range sounding NDP PPDU format may be utilized. FIG. 2 illustrates an example design 200 of a proposed long range sounding NDP PPDU format under the proposed scheme. Referring to FIG. 2, in design 200, a 20 MHz legacy preamble, a Universal Signal (U-SIG) field and an EHT Signal (EHT-SIG) field for a 20 MHz sub-channel may be duplicated (e.g., four times for a 80 MHz frequency segment). For LPI LR PPDU, the EHT-SIG may have a 1111 structure in each 80 MHz frequency segment. Design 200 may include an EHT-STF with DT-RU (herein interchangeably denoted as “distributed-tone STF” or “DT-STF”) and an EHT-LTF with DT-RU (herein interchangeably denoted as “distributed-tone LTF” or “DT-LTF”). In the U-SIG, there may be an indication of PPDU format to indicate at least two kinds of EHT PPDU formats, namely: EHT DT or EHT. In design 200, EHT-STF corresponding to DT-RU and EHT-LTF corresponding to DT-RU may be selective from wide-bandwidth EHT-STF and EHT-LTF, respectively. Under the proposed scheme, a receiver may perform 80 MHz packet detection and maximum ratio combining (MRC) over four 20 MHz sub-channels on U-SIG and EHT-SIG.

Under one proposed scheme in accordance with the present disclosure with respect to orthogonal frequency-division multiple access (OFDMA) EHT distributed tone (EHT-DT) NDP sounding, the DT-STF and DT-LTF in an EHT-DT NDP may contain the DT-RUs (e.g., RU26, RU52, RU106 and so on) of one or more target sounded STAs. Under the proposed scheme, a single-user (SU) format may be utilized for high-efficiency (HE) NDP PPDUs, while a multi-user (MU), or OFDMA, format may be utilized for EHT-DT NDP PPDUs. Accordingly, different users may be on different distributed tones of EHT-LTFs according to a DT-RU on which one or more long range PPDUs are transmitted by a beamformer.

Under another proposed scheme in accordance with the present disclosure with respect to OFDMA EHT-DT NDP sounding, the DT-STF and DT-LTF in an EHT-DT NDP may contain one predetermined set of distributed (or discrete) tones for each bandwidth. The predetermined set of distributed (or discrete) tones may not match with DT-RUs. The predetermined set of distributed (or discrete) tones may be separated by N−1 tones, where 2≤N≤13. For instance, for 20 MHz sounding with DT-RUs, distributed-tone NDP sounding for 20 MHz may be [−122, −122+N, −122+2N, . . . ]. Similarly, for 80 MHz sounding with DT-RUs, distributed-tone NDP sounding for 80 MHz may be [−500, −500+N, −500+2N, . . . ]. Under the proposed scheme, only the predetermined set of distributed (or discrete) tones may have non-zero energy on them, with other tones having zero energy and thus may be treated as null tones. Under the proposed scheme, a sounding receiver provides compressed beamforming feedbacks on the predetermined set of distributed (or discrete) tones. The beamformer may interpolate the predetermined set of distributed (or discrete) tones to obtain the channels of corresponding tones for DT-RUs and/or continuous-tone (regular) RUs that may be used for data transmission. The beamformer may transmit on DT-RUs using a beamforming matrix generated from the interpolated channels.

Figure 3:
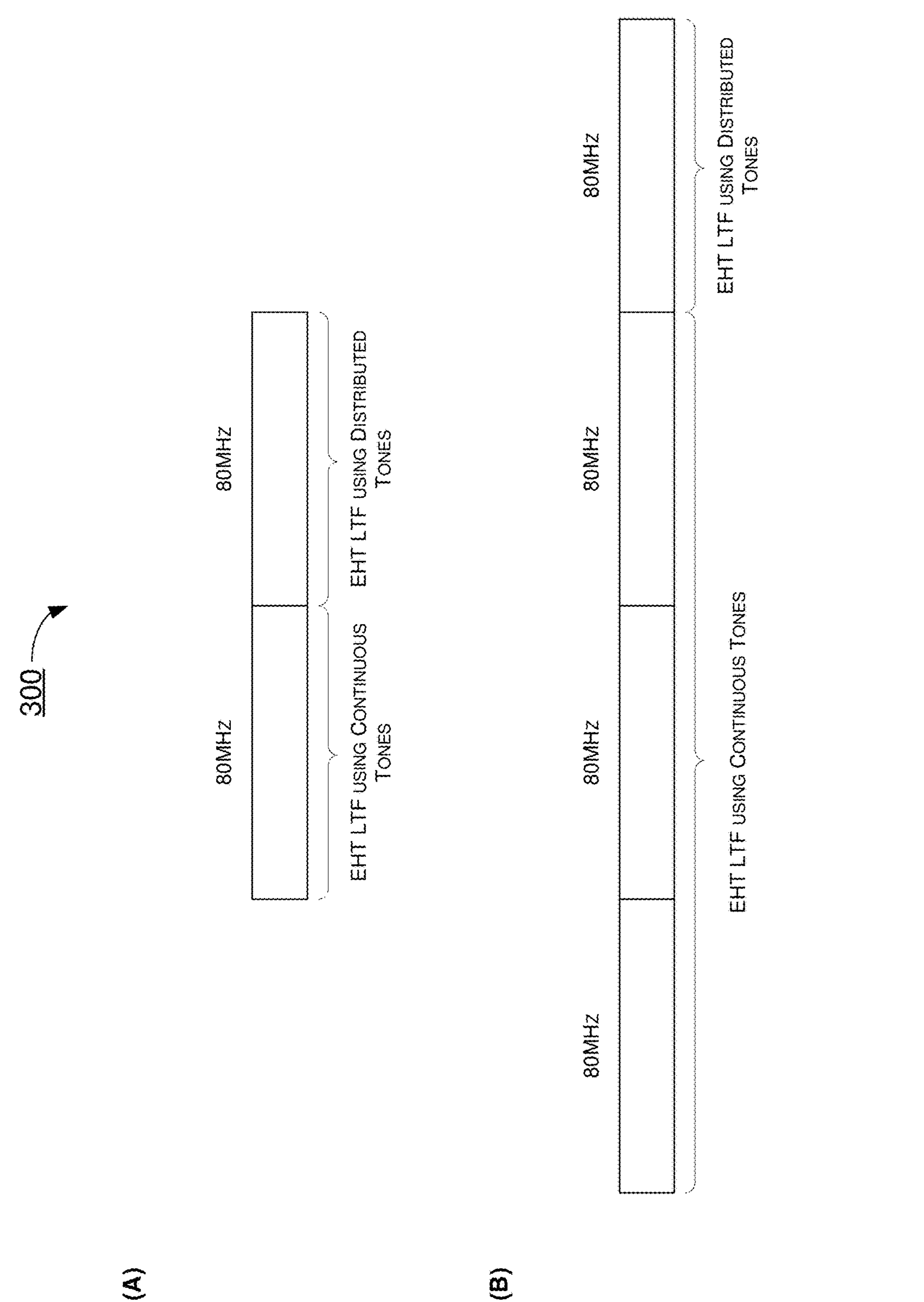
FIG. 3 is a diagram of an example scenario in accordance with an implementation of the present disclosure.

Under one proposed scheme in accordance with the present disclosure with respect to mixed-format NDP sounding, a mixed-format NDP may be used to sound STAs using normal RUs and/or multi-RUs (MRUs) and to sound STAs using distributed tones (e.g., for long range STAs in 6 GHz LPI). The mixed-format NDP may contain both continuous tones and predetermined distributed tones on different frequency segments or RUs respectively. FIG. 3 illustrates an example scenario 300 under the proposed scheme. Referring to part (A) of FIG. 3, for a 160 MHz mixed-format NDP, a first 80 MHz frequency segment may utilize an EHT-LTF with continuous tones while a second 80 MHz frequency segment may utilize an EHT-LTF with distributed (or discrete) tones. Referring to part (B) of FIG. 3, for a 320 MHz mixed-format NDP, a first 80 MHz frequency segment may utilize an EHT-LTF with continuous tones while a fourth 80 MHz frequency segment may utilize an EHT-LTF with distributed (or discrete) tones.

Under one proposed scheme in accordance with the present disclosure with respect to EHT NDP sounding protocol, a sounding NDP type may be indicated in an EHT NDP Announcement frame or in the U-SIG field of an EHT sounding NDP. The sounding NDP type may be EHT NDP, EHT DT NDP or mixed-format EHT NDP. Under the proposed scheme, the frequency segment or RU using continuous tones and distributed (or discrete) tones may be indicated in the EHT NDP Announcement frame. This may be indicated by a bitmap with each bit representing continuous or distributed tone on a respective frequency segment.

Figure 4:
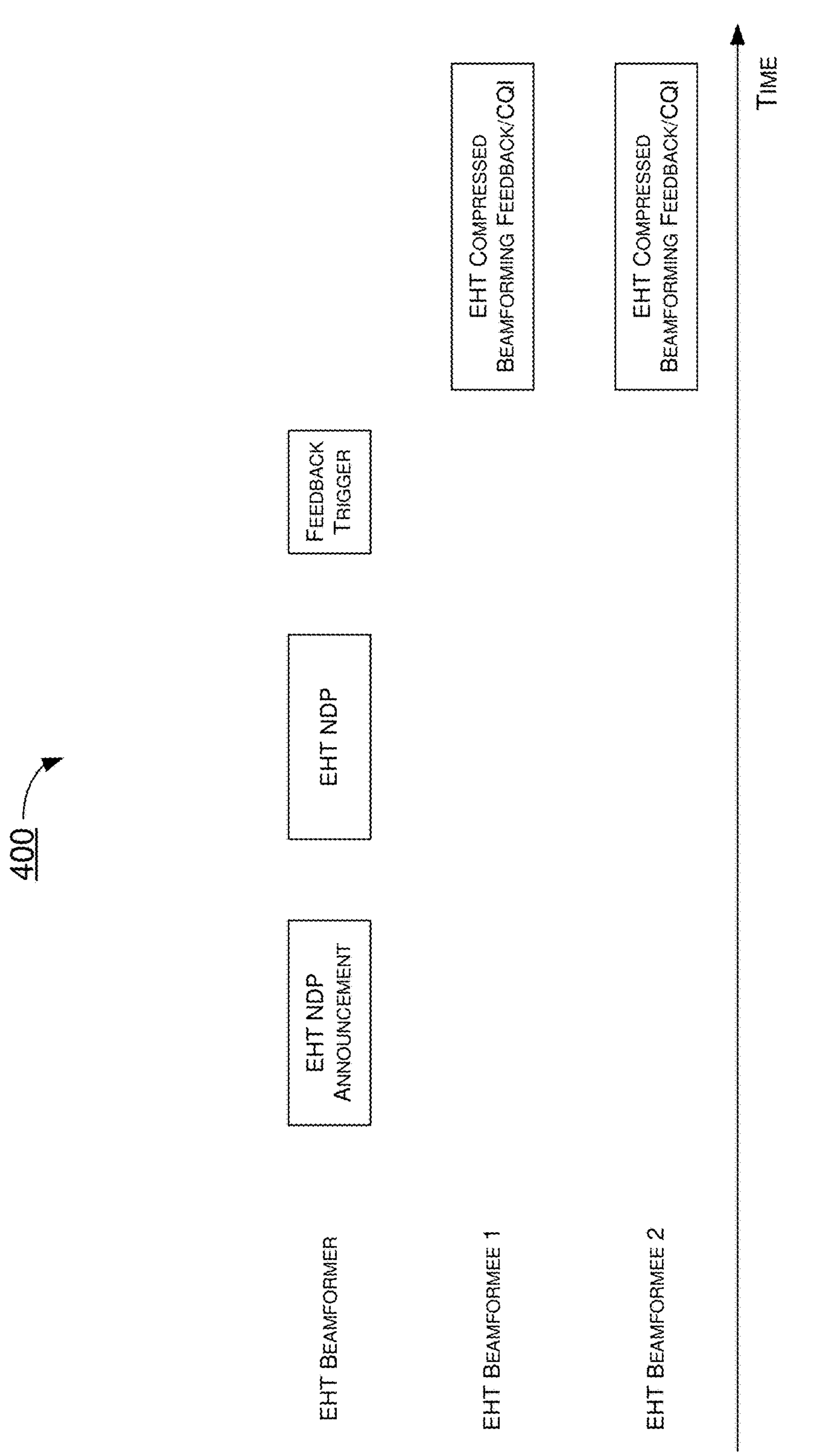
FIG. 4 is a diagram of an example scenario in accordance with an implementation of the present disclosure.

Under the proposed scheme, the compressed beamforming and/or channel quality indicator (CQI) feedback may utilize grouping Ng=1 in case the sounding NDP is EHT DT type. The compressed beamforming/CQI feedback may utilize grouping Ng=4 or 8 or 16 in case the sounding NDP is EHT type. The compressed beamforming/CQI feedback may also be triggered to be transmitted as feedback using an uplink (UL) OFDMA DT PPDU. Multiple beamformees may be sounded using an EHT DT NDP or a mixed-format EHT NDP. The beamformee(s) receiving DT sounding may provide beamforming feedback using an UL OFDMA format with DT-RUs. The beamformee(s) receiving continuous-tone sounding may provide beamforming feedback using an UL OFDMA format using normal RUs and/or MRUs. FIG. 4 illustrates an example scenario 400 under the proposed scheme.

Illustrative Implementations

Figure 5:
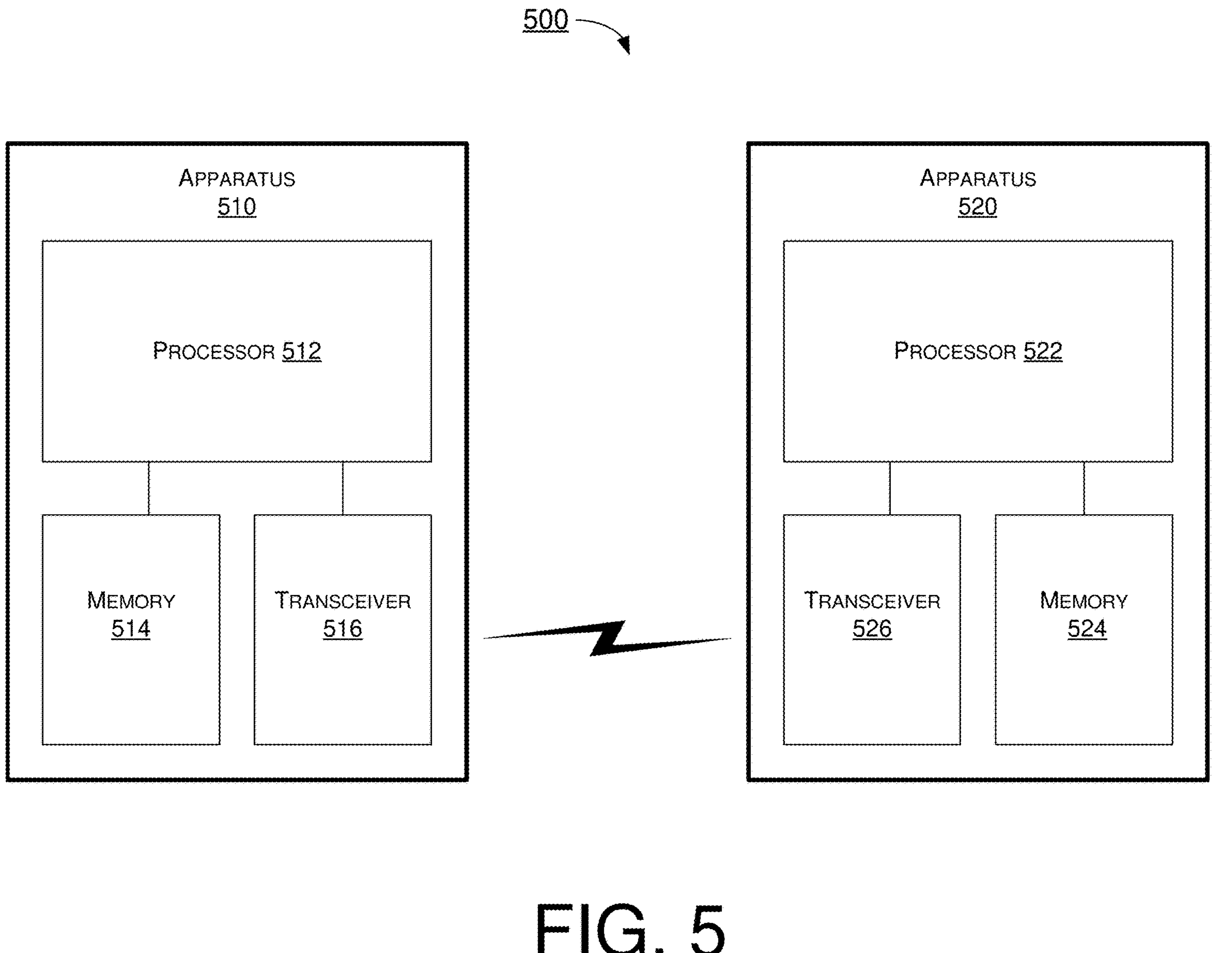
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to sounding schemes using distributed tones in wireless communications, including the various schemes described above with respect to various proposed designs, concepts, schemes, systems and methods described above as well as processes described below. For instance, apparatus 510 may be an example implementation of communication entity 110, and apparatus 520 may be an example implementation of communication entity 120.

Each of apparatus 510 and apparatus 520 may be a part of an electronic apparatus, which may be a STA or an AP, such as a portable or mobile apparatus, a wearable apparatus, a wireless communication apparatus or a computing apparatus. For instance, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a STA or an AP. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to sounding schemes using distributed tones in wireless communications in accordance with various implementations of the present disclosure. For instance, each of processor 512 and processor 522 may be configured with hardware components, or circuitry, implementing one, some or all of the examples described and illustrated herein.

In some implementations, apparatus 510 may also include a transceiver 516 coupled to processor 512. Transceiver 516 may be capable of wirelessly transmitting and receiving data. In some implementations, apparatus 520 may also include a transceiver 526 coupled to processor 522. Transceiver 526 may include a transceiver capable of wirelessly transmitting and receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as communication entity 110, and apparatus 520, as communication entity 120, is provided below. It is noteworthy that, although the example implementations described below are provided in the context of WLAN, the same may be implemented in other types of networks. Thus, although the following description of example implementations pertains to a scenario in which apparatus 510 functions as a transmitting device and apparatus 520 functions as a receiving device, the same is also applicable to another scenario in which apparatus 510 functions as a receiving device and apparatus 520 functions as a transmitting device.

Under a proposed scheme in accordance with the present disclosure with respect to sounding schemes using distributed tones in wireless communications, processor 512 of apparatus 510, implemented in or as communication entity 110, may receive, via transceiver 516, a sounding signal with an EHT NDP from apparatus 520 implemented in or as communication entity 120. Additionally, processor 512 may transmit, via transceiver 516, to apparatus 520 a feedback regarding the sounding signal on a DT-RU.

In some implementations, the EHT NDP may contain a legacy preamble, a U-SIG and an EHT-SIG duplicated for each of four 20 MHz sub-channels of a 80 MHz frequency segment.

In some implementations, in receiving the sounding signal, processor 512 may perform 80 MHz packet detection and MRC over the four 20 MHz sub-channels on the U-SIG and the EHT-SIG.

In some implementations, the U-SIG may indicate a PPDU format as either EHT or EHT DT.

In some implementations, the EHT NDP may further contain a DT-STF and a DT-LTF for the 80 MHz frequency segment.

In some implementations, each of the DT-STF and the DT-LTF may contain respective one or more DT-RUs for one or more target STAs of the sounding signal with each of the respective one or more DT-RUs corresponding to a respective one of the one or more target STAs. Alternatively, each of the DT-STF and the DT-LTF may contain a predetermined set of distributed tones for each bandwidth. In such cases, each distributed tone in the predetermined set of distributed tones may have non-zero energy while other tones may be null tones with zero energy.

In some implementations, in transmitting the feedback, processor 512 may transmit a compressed beamforming feedback on one or more distributed tones in the predetermined set of distributed tones.

In some implementations, distributed tones in the predetermined set of distributed tones may not match with one or more DT-RUs corresponding to one or more target STAs of the sounding signal.

In some implementations, every two adjacent distributed tones in the respective predetermined set of distributed tones may be separated by N−1 tones, $2 \le N \le 13$.

In some implementations, the EHT NDP may include a mixed-format NDP that contains continuous tones and predetermined distributed tones on different frequency segments. In some implementations, the different frequency segments may include at least a first 80 MHz frequency segment a second 80 MHz frequency segment. In such cases, the first 80 MHz frequency segment may utilize a first EHT-LTF with the continuous tones, and the second 80 MHz frequency segment may utilize a second EHT-LTF with the distributed tones.

In some implementations, processor 512 may perform additional operations. For instance, processor 512 may determine a type of the EHT NDP based on an EHT NDP Announcement frame or based on the U-SIG in the EHT NDP. Moreover, processor 512 may receive, via transceiver 516, a feedback trigger which triggers the transmitting of the feedback.

In some implementations, responsive to determining the type of the EHT NDP based on the EHT NDP Announcement frame, a first frequency segment or a first RU using continuous tones and a second frequency segment or a second RU using distributed tones may be indicated by the EHT NDP Announcement frame.

Under another proposed scheme in accordance with the present disclosure with respect to sounding schemes using distributed tones in wireless communications, processor 522 of apparatus 520, implemented in or as communication entity 120, may transmit, via transceiver 526, a sounding signal with an EHT NDP to apparatus 510 implemented in or as communication entity 110. Moreover, processor 522 may receive, via transceiver 526, a feedback regarding the sounding signal on a DT-RU.

In some implementations, the EHT NDP may contain a legacy preamble, a U-SIG and an EHT-SIG duplicated for each of four 20 MHz sub-channels of a 80 MHz frequency segment. Moreover, the U-SIG may indicate a PPDU format as either EHT or EHT DT. Furthermore, the EHT NDP may further contain a DT-STF and a DT-LTF for the 80 MHz frequency segment.

In some implementations, each of the DT-STF and the DT-LTF may contain either: (a) respective one or more DT-RUs for one or more target STAs of the sounding signal with each of the respective one or more DT-RUs corresponding to a respective one of the one or more target STAs; or (b) a predetermined set of distributed tones for each bandwidth with each distributed tone in the predetermined set of distributed tones having non-zero energy and with other tones having zero energy. In such cases, distributed tones in the predetermined set of distributed tones may not match with one or more DT-RUs corresponding to the one or more target STAs of the sounding signal. Additionally, every two adjacent distributed tones in the respective predetermined set of distributed tones may be separated by N−1 tones, 2≤N≤13.

In some implementations, the EHT NDP may include a mixed-format NDP that contains continuous tones and predetermined distributed tones on different frequency segments. In some implementations, the different frequency segments may include at least a first 80 MHz frequency segment a second 80 MHz frequency segment. In such cases, the first 80 MHz frequency segment may utilize a first EHT-LTF with the continuous tones, and the second 80 MHz frequency segment may utilize a second EHT-LTF with the distributed tones.

In some implementations, processor 522 may perform additional operations. For instance, processor 522 may transmit, via transceiver 526, an EHT NDP Announcement frame that indicates a type of the EHT NDP. Moreover, processor 522 may transmit, via transceiver 526, a feedback trigger which causes the receiving of the feedback. In such cases, a first frequency segment or a first RU using continuous tones and a second frequency segment or a second RU using distributed tones may be indicated by the EHT NDP Announcement frame.

Illustrative Processes

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to sounding schemes using distributed tones in wireless communications in accordance with the present disclosure. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 as communication entity 110 (e.g., a transmitting device whether a STA or an AP) and apparatus 520 as communication entity 120 (e.g., a receiving device whether a STA or an AP) of a wireless network such as a WLAN in accordance with one or more of IEEE 802.11 standards. Process 600 may begin at block 610.

At 610, process 600 may involve processor 512 of apparatus 510, implemented in or as communication entity 110, receiving, via transceiver 516, a sounding signal with an EHT NDP from apparatus 520 implemented in or as communication entity 120. Process 600 may proceed from 610 to 620.

At 620, process 600 may involve processor 512 transmitting, via transceiver 516, to apparatus 520 a feedback regarding the sounding signal on a DT-RU.

In some implementations, the EHT NDP may contain a legacy preamble, a U-SIG and an EHT-SIG duplicated for each of four 20 MHz sub-channels of a 80 MHz frequency segment.

In some implementations, in receiving the sounding signal, process 600 may involve processor 512 performing 80 MHz packet detection and MRC over the four 20 MHz sub-channels on the U-SIG and the EHT-SIG.

In some implementations, the U-SIG may indicate a PPDU format as either EHT or EHT DT.

In some implementations, the EHT NDP may further contain a DT-STF and a DT-LTF for the 80 MHz frequency segment.

In some implementations, each of the DT-STF and the DT-LTF may contain respective one or more DT-RUs for one or more target STAs of the sounding signal with each of the respective one or more DT-RUs corresponding to a respective one of the one or more target STAs. Alternatively, each of the DT-STF and the DT-LTF may contain a predetermined set of distributed tones for each bandwidth. In such cases, each distributed tone in the predetermined set of distributed tones may have non-zero energy while other tones may be null tones with zero energy.

In some implementations, in transmitting the feedback, process 600 may involve processor 512 transmitting a compressed beamforming feedback on one or more distributed tones in the predetermined set of distributed tones.

In some implementations, distributed tones in the predetermined set of distributed tones may not match with one or more DT-RUs corresponding to one or more target STAs of the sounding signal.

In some implementations, every two adjacent distributed tones in the respective predetermined set of distributed tones may be separated by N−1 tones, 2≤N≤13.

In some implementations, the EHT NDP may include a mixed-format NDP that contains continuous tones and predetermined distributed tones on different frequency segments. In some implementations, the different frequency segments may include at least a first 80 MHz frequency segment a second 80 MHz frequency segment. In such cases, the first 80 MHz frequency segment may utilize a first EHT-LTF with the continuous tones, and the second 80 MHz frequency segment may utilize a second EHT-LTF with the distributed tones.

In some implementations, process 600 may involve processor 512 performing additional operations. For instance, process 600 may involve processor 512 determining a type of the EHT NDP based on an EHT NDP Announcement frame or based on the U-SIG in the EHT NDP. Moreover, process 600 may involve processor 512 receiving, via transceiver 516, a feedback trigger which triggers the transmitting of the feedback.

In some implementations, responsive to determining the type of the EHT NDP based on the EHT NDP Announcement frame, a first frequency segment or a first RU using continuous tones and a second frequency segment or a second RU using distributed tones may be indicated by the EHT NDP Announcement frame.

Figure 7:
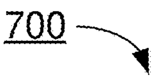
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to sounding schemes using distributed tones in wireless communications in accordance with the present disclosure. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 510 and apparatus 520 as well as any variations thereof. Solely for illustrative purposes and without limiting the scope, process 700 is described below in the context of apparatus 510 as communication entity 110 (e.g., a transmitting device whether a STA or an AP) and apparatus 520 as communication entity 120 (e.g., a receiving device whether a STA or an AP) of a wireless network such as a WLAN in accordance with one or more of IEEE 802.11 standards. Process 700 may begin at block 710.

At 710, process 700 may involve processor 522 of apparatus 520, implemented in or as communication entity 120, transmitting, via transceiver 526, a sounding signal with an EHT NDP to apparatus 510 implemented in or as communication entity 110. Process 700 may proceed from 710 to 720.

At 720, process 700 may involve processor 522 receiving, via transceiver 526, a feedback regarding the sounding signal on a DT-RU.

In some implementations, the EHT NDP may contain a legacy preamble, a U-SIG and an EHT-SIG duplicated for each of four 20 MHz sub-channels of a 80 MHz frequency segment. Moreover, the U-SIG may indicate a PPDU format as either EHT or EHT DT. Furthermore, the EHT NDP may further contain a DT-STF and a DT-LTF for the 80 MHz frequency segment.

In some implementations, each of the DT-STF and the DT-LTF may contain either: (a) respective one or more DT-RUs for one or more target STAs of the sounding signal with each of the respective one or more DT-RUs corresponding to a respective one of the one or more target STAs; or (b) a predetermined set of distributed tones for each bandwidth with each distributed tone in the predetermined set of distributed tones having non-zero energy and with other tones having zero energy. In such cases, distributed tones in the predetermined set of distributed tones may not match with one or more DT-RUs corresponding to the one or more target STAs of the sounding signal. Additionally, every two adjacent distributed tones in the respective predetermined set of distributed tones may be separated by N−1 tones, $2 \le N \le 13$.

In some implementations, the EHT NDP may include a mixed-format NDP that contains continuous tones and predetermined distributed tones on different frequency segments. In some implementations, the different frequency segments may include at least a first 80 MHz frequency segment a second 80 MHz frequency segment. In such cases, the first 80 MHz frequency segment may utilize a first EHT-LTF with the continuous tones, and the second 80 MHz frequency segment may utilize a second EHT-LTF with the distributed tones.

In some implementations, process 700 may involve processor 522 performing additional operations. For instance, process 700 may involve processor 522 transmitting, via transceiver 526, an EHT NDP Announcement frame that indicates a type of the EHT NDP. Moreover, process 700 may involve processor 522 transmitting, via transceiver 526, a feedback trigger which causes the receiving of the feedback. In such cases, a first frequency segment or a first RU using continuous tones and a second frequency segment or a second RU using distributed tones may be indicated by the EHT NDP Announcement frame.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving a sounding signal with an extremely-high-throughput (EHT) null data packet (NDP), wherein the EHT NDP includes at least one larger distributed-tone resource unit (DT-RU) comprising a plurality of blank tones as well as tones of first and second RUs smaller than 996 tones with the tones of the first and second RUs distributed in a non-contiguous fashion on a plurality of non-continuous tones of the larger DT-RU without filling up an entire bandwidth of the larger DT-RU such that each distributed tone of the first RU and each distributed tone of the second RU is between respective two blank tones of the plurality of blank tones of the larger DT-RU; and transmitting a feedback regarding the sounding signal.

2. The method of claim 1, wherein the EHT NDP contains a legacy preamble that is duplicated for each of four 20 MHz sub-channels of a 80 MHz frequency segment, a Universal Signal field (U-SIG) that is duplicated for each of the four 20 MHz sub-channels of the 80 MHz frequency segment, and an EHT Signal field (EHT-SIG) that is duplicated for each of the four 20 MHz sub-channels of the 80 MHz frequency segment.

3. The method of claim 2, wherein the receiving of the sounding signal comprises performing 80 MHz packet detection and maximum ratio combining (MRC) over the four 20 MHz sub-channels on the U-SIG and the EHT-SIG.

4. The method of claim 2, wherein the U-SIG indicates a physical-layer protocol data unit (PPDU) format as either EHT or EHT distributed-tone (EHT DT).

5. The method of claim 2, wherein the EHT NDP further contains a distributed-tone short training field (DT-STF) and a distributed-tone long training field (DT-LTF) for the 80 MHz frequency segment.

6. The method of claim 5, wherein each of the DT-STF and the DT-LTF contains respective one or more DT-RUs for one or more target stations (STAs) of the sounding signal with each of the respective one or more DT-RUs corresponding to a respective one of the one or more target STAs.

7. The method of claim 5, wherein each of the DT-STF and the DT-LTF contains a predetermined set of distributed tones for each bandwidth, and wherein each distributed tone in the predetermined set of distributed tones has non-zero energy while other tones are null tones with zero energy.

8. The method of claim 7, wherein the transmitting of the feedback comprises transmitting a compressed beamforming feedback on one or more distributed tones in the predetermined set of distributed tones.

9. The method of claim 7, wherein distributed tones in the predetermined set of distributed tones do not match with one or more DT-RUs corresponding to one or more target stations (STAs) of the sounding signal.

10. The method of claim 7, wherein every two adjacent distributed tones in the respective predetermined set of distributed tones are separated by N−1 tones, $2 \leq N \leq 13$.

11. The method of claim 1, wherein the EHT NDP comprises a mixed-format NDP that contains continuous tones and predetermined distributed tones on different frequency segments.

12. The method of claim 11, wherein the different frequency segments comprise at least a first 80 MHz frequency segment and a second 80 MHz frequency segment, wherein the first 80 MHz frequency segment uses a first EHT long training field (EHT-LTF) with the continuous tones, and wherein the second 80 MHz frequency segment uses a second EHT-LTF with the predetermined distributed tones.

13. The method of claim 1, further comprising:

determining a type of the EHT NDP based on an EHT NDP Announcement frame or based on a Universal Signal field (U-SIG) in the EHT NDP; and receiving a feedback trigger which triggers the transmitting of the feedback.

14. The method of claim 13, wherein, responsive to determining the type of the EHT NDP based on the EHT NDP Announcement frame, a first frequency segment or a first RU using continuous tones and a second frequency segment or a second RU using distributed tones are indicated by the EHT NDP Announcement frame.

15. A method, comprising:

transmitting a sounding signal with an extremely-high-throughput (EHT) null data packet (NDP), wherein the EHT-NDP includes at least one larger distributed-tone resource unit (DT-RU) comprising a plurality of blank tones as well as tones of first and second RUs smaller than 996 tones with the tones of the first and second RUs distributed in a non-contiguous fashion on a plurality of non-continuous tones of the larger DT-RU without filling up an entire bandwidth of the larger DT-RU such that each distributed tone of the first RU and each distributed tone of the second RU is between respective two blank tones of the plurality of blank tones of the larger DT-RU; and receiving a feedback regarding the sounding signal.

16. The method of claim 15, wherein the EHT NDP contains a legacy preamble that is duplicated for each of four 20 MHz sub-channels of a 80 MHz frequency segment, a Universal Signal field (U-SIG) that is duplicated for each of the four 20 MHz sub-channels of the 80 MHz frequency segment, and an EHT Signal field (EHT-SIG) that is duplicated for each of the four 20 MHz sub-channels of the 80 MHz frequency segment, and wherein the U-SIG indicates a physical-layer protocol data unit (PPDU) format as either EHT or EHT distributed-tone (EHT DT), wherein the EHT NDP further contains a distributed-tone short training field (DT-STF) and a distributed-tone long training field (DT-LTF) for the 80 MHz frequency segment.

17. The method of claim 16, wherein each of the DT-STF and the DT-LTF contains either:

respective one or more DT-RUs for one or more target stations (STAs) of the sounding signal with each of the respective one or more DT-RUs corresponding to a respective one of the one or more target STAs; or a predetermined set of distributed tones for each bandwidth with each distributed tone in the predetermined set of distributed tones having non-zero energy and with other tones having zero energy, wherein distributed tones in the predetermined set of distributed tones do not match with one or more DT-RUs corresponding to the one or more target STAs of the sounding signal, and wherein every two adjacent distributed tones in the respective predetermined set of distributed tones are separated by N−1 tones, $2 \leq N \leq 13$.

18. The method of claim 15, wherein the EHT NDP comprises a mixed-format NDP that contains continuous tones and predetermined distributed tones on different frequency segments, wherein the different frequency segments comprises at least a first 80 MHz frequency segment and a second 80 MHz frequency segment, wherein the first 80 MHz frequency segment uses a first EHT long training field (EHT-LTF) with the continuous tones, and wherein the second 80 MHz frequency segment uses a second EHT-LTF with the predetermined distributed tones.

19. The method of claim 15, further comprising:

transmitting an EHT NDP Announcement frame that indicates a type of the EHT NDP; and transmitting a feedback trigger which causes the receiving of the feedback, wherein a first frequency segment or a first RU using continuous tones and a second frequency segment or a second RU using distributed tones are indicated by the EHT NDP Announcement frame.

20. An apparatus, comprising:

a transceiver configured to communicate wirelessly; and a processor coupled to the transceiver and configured to perform operations comprising:

receiving, via the transceiver, a sounding signal with an extremely-high-throughput (EHT) null data packet (NDP), wherein the EHT NDP includes at least one larger distributed-tone resource unit (DT-RU) comprising a plurality of blank tones as well as tones of first and second RUs smaller than 996 tones with the tones of the first and second RUs distributed in a non-contiguous fashion on a plurality of non-continuous tones of the larger DT-RU without filling up an entire bandwidth of the larger DT-RU such that each distributed tone of the first RU and each distributed tone of the second RU is between respective two blank tones of the plurality of blank tones of the larger DT-RU; and transmitting, via the transceiver, a feedback regarding the sounding signal, wherein:

the EHT NDP contains a legacy preamble that is duplicated for each of four 20 MHz sub-channels of an 80 MHz frequency segment, a Universal Signal field (U-SIG) that is duplicated for each of the four 20 MHz sub-channels of the 80 MHz frequency segment, and an EHT Signal field (EHT-SIG) that is duplicated for each of the four 20 MHz sub-channels of the 80 MHz frequency segment, the receiving of the sounding signal comprises performing 80 MHz packet detection and maximum ratio combining (MRC) over the four 20 MHz sub-channels on the U-SIG and the EHT-SIG, the U-SIG indicates a physical-layer protocol data unit (PPDU) format as either EHT or EHT distributed-tone (EHT DT), and the EHT NDP further contains a distributed-tone short training field (DT-STF) and a distributed-tone long training field (DT-LTF) for the 80 MHz frequency segment.

* * * * *